United States Patent [19]
Jarman

[11] 3,847,817
[45] Nov. 12, 1974

[54] FILTER UNIT HAVING A GENERALLY CYLINDRICAL FILTER ELEMENT SUPPORTED ON BEARINGS

[75] Inventor: Ronald D. Jarman, Brady Township, Kalamazoo City, Mich. 49097

[73] Assignee: Dover Corporation, Portage, Mich.

[22] Filed: Dec. 4, 1972

[21] Appl. No.: 311,789

[52] U.S. Cl.................. 210/297, 210/298, 210/304
[51] Int. Cl............................................ B01d 33/00
[58] Field of Search ........... 210/247, 297, 304, 384, 210/391, 393, 397, 408, 411, 456

[56] References Cited
UNITED STATES PATENTS

| | | | |
|---|---|---|---|
| 3,363,771 | 1/1968 | Walters | 210/304 |
| 3,491,889 | 1/1970 | Walters | 210/411 |
| 779,346 | 1/1905 | Bendix et al. | 210/408 |
| 3,338,416 | 8/1967 | Barry | 210/297 |

*Primary Examiner*—Frank A. Spear, Jr.
*Assistant Examiner*—Ferris H. Lander
*Attorney, Agent, or Firm*—Woodhams, Blanchard and Flynn

[57] ABSTRACT

A filter apparatus comprises a filter element inside a stationary housing. In one embodiment, an inlet manifold extends helically along the outside of the housing. A director blade within the housing causes the unfiltered liquid from the inlet manifold to strike the filter element tangentially in a direction opposing filter element rotation. The filtered liquid passing through the filter element is withdrawn from the interior of the filter element. A stationary vane or deflector inside the filter element parallels the director blade and inlet manifold and forces some filtered liquid radially outwardly through the filter element, at the point where the inward flow impinges on the filter element, for loosening contaminant from the outside of the filter element. Adjacent this point a gathering blade extends inward from the housing toward the filter element in parallelism with the inlet manifold to intercept the rotational flow and loosened contaminant adjacent the outside of the filter element and direct same radially outwardly into a drain chamber, creating a vortex flow therein. The drain chamber is oriented and contoured to cause vortex flow downwardly to direct contaminant particles to a drain.

In another embodiment, the helical inlet manifold is omitted and the filter liquid is merely introduced into the housing externally of the filter element by a suitable conduit. In a further embodiment, the guide vane or deflector inside the filter element is omitted and a backwash liquid supply tube is provided within the filter element opposite the gathering blade and has outlet openings facing the filter element wall for direction of backwash liquid flow outwardly through the filter element to force contaminant particles from the exterior of the filter element.

18 Claims, 7 Drawing Figures

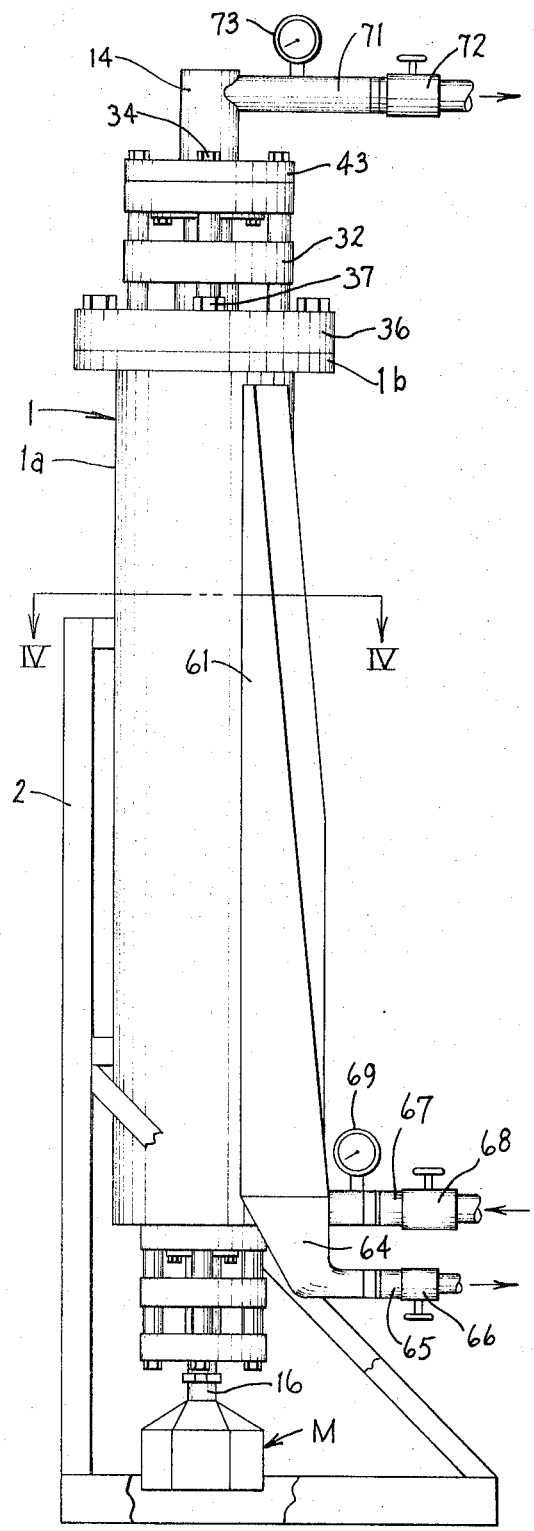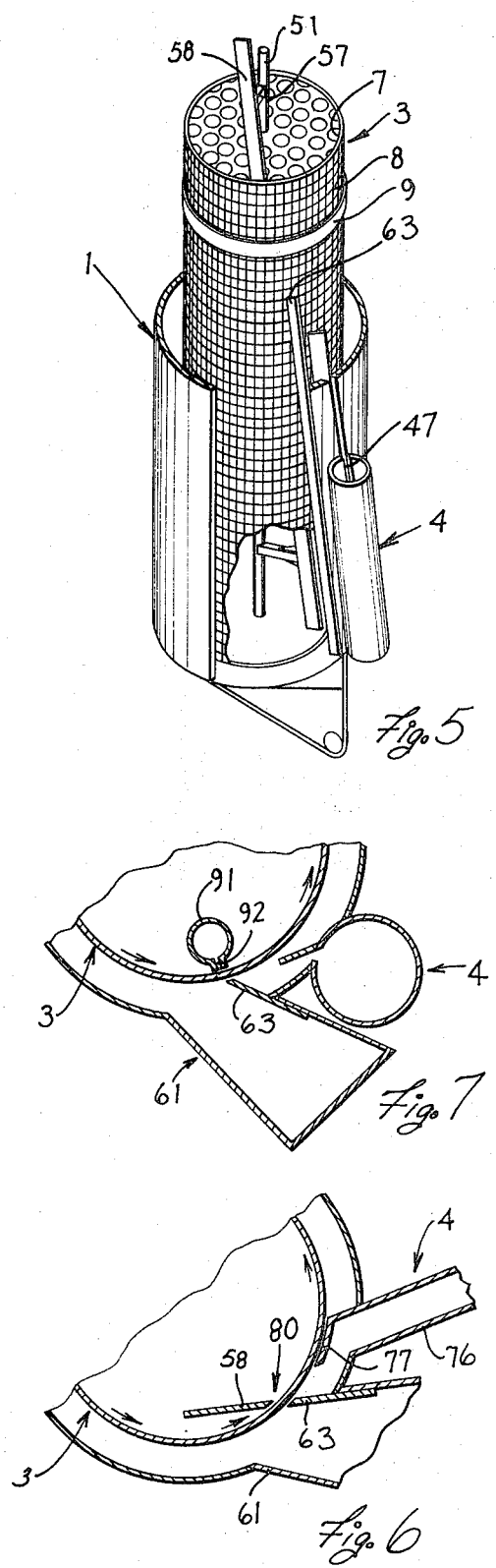
Fig. 3
Fig. 5
Fig. 7
Fig. 6

3,847,817

FILTER UNIT HAVING A GENERALLY CYLINDRICAL FILTER ELEMENT SUPPORTED ON BEARINGS

FIELD OF THE INVENTION

The invention relates to a filter unit having a generally cylindrical rotatable filter element positioned inside a generally cylindrical housing. The rotation of said filter element in association with appropriately positioned deflector means adjacent thereto provides a highly efficient self-cleaning filtration system.

BACKGROUND OF THE INVENTION

In the provision of filters for industrial operations, particularly in liquid process industries, including pulp and paper manufacturing operations, it is well known to provide filters comprising generally cylindrical housings having therein similarly cylindrical filter elements. Normally the filter element is coaxially positioned within the housing. The liquid to be filtered is often introduced into the bottom of said housing, flows radially inwardly through said filter element and then upwardly out through the open end at the top of the filter element. It is well known that filter elements of this type will, in removing contaminants and other particulate matter from the liquid to be filtered, eventually suffer contaminant build-up on the filter surface and thereby become incapable of proper operation. It is, therefore, necessary periodically to clean the filter medium in some manner. Various methods are utilized for cleaning the filter media, such as removing the filter element from the housing and either hand or machine cleaning the separate elements and housing. Other more sophisticated filtration systems use a backwash cycle which in effect reverses the flow of the filtrate, or directs an external fluid, back through the filter and housing. Some of these backwashing filters incorporate various automatic devices and complicated sequencing mechanisms to maintain proper and efficient filtration, prevent the loss of expensive liquids bieng filtered during backwashing and/or minimize the periodic loss of flow capacity.

In addition to the problems created by the necessary periodic cleaning of the filter media, there is an even greater problem in the removal of contaminants from fluids where the weight of contaminant per fluid volume is abnormally large and this problem also has proven difficult to solve. In such cases the filter media must incorporate openings which either permit passage of most of the contaminant or else cleaning by backwashing is literally a continuous operation.

In such cases, as for example with "white water" in the paper mills, the industry has either not used filtration, or at best used extremely inefficient filtering systems.

In view of the above, it is a principal object of this invention to provide a filtration system which will operate for indefinite periods without a separate backwashing cycle to remove contaminant collected on the filter surface.

A further object of the invention is to provide apparatus, as aforesaid, which will efficiently and continuously filter fluid having heavy concentrations of contaminant per volume of fluid, which filtering up to the present time has not proven successful with existing equipment.

A further object of the invention is to provide apparatus, as aforesaid, which will be simple and inexpensive to manufacture and maintain in good operating condition over long periods of time and under rigorous service conditions.

A further object of the invention is to provide apparatus, as aforesaid, which will provide continuous filtration with a minimum of down time for filter maintenance and cleaning even though contaminant concentration is relatively high or unusually intermittent.

A further object of the invention is to provide apparatus, as aforesaid, which is compactly constructed to require a minimum amount of floor space, will be self-contained to require a minimum of connections upon installation and will operate on standard power and fluid connections.

A further object of the invention is to provide an apparatus, as aforesaid, which will be free from complex automatic controls and sequencing devices.

Other objects and purposes of the invention will be apparent to persons acquainted with apparatus of this general type upon reading the following specification and inspecting the accompanying drawings.

BRIEF DESCRIPTION OF THE DRAWINGS

In the drawings:

FIG. 3 is a side external view of the filter unit, showing inlet, outlet and drain connections.

FIG. 5 is an isometric, partially broken, view showing the angular orientation of the inlet manifold deflector, guide vane, gathering blade and vortex drain chamber.

FIG. 6 is a fragmentary indication of a modification.

FIG. 7 is a fragmentary indication of a further modification.

SUMMARY OF THE INVENTION

Figure 1:
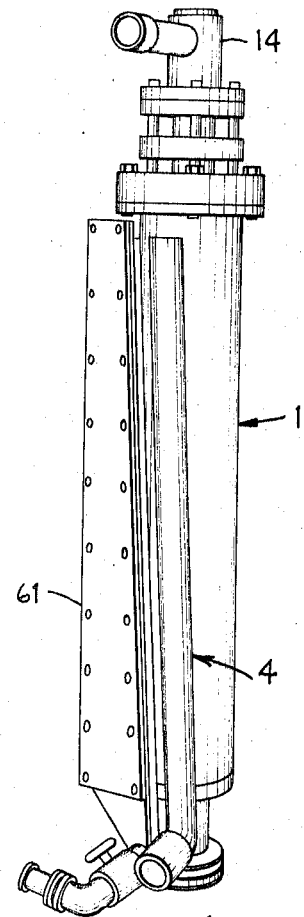
FIG. 1 is an elevational view of a filter unit embodying the invention.

The objects and purposes of this invention are met by providing a filter apparatus which incorporates a rotating filter element inside a stationary housing. The liquid to be filtered is introduced into the housing through an inlet manifold which in one embodiment runs in helical fashion along the outside of the housing for the entire length of the filter element. The inlet flow is shaped and directed, by an internal deflector, to strike the filter element tangentially in a direction opposing said filter element rotation. The liquid passes through said filter element and the filtered liquid is withdrawn from the interior of the filter element at the top of the unit housing.

A stationary guide vane or deflector, inside the filter element which runs parallel to the helical inlet flow deflector forces some of the filtrate radially outward through the element at the point where the inward flow impinges on said filter element. Also, at this point a stationary gathering blade attached to the housing and following the same helical configuration as the inlet manifold and guide vane, and with its innermost edge in close proximity to the rotating filter element, intercepts the rotational flow and loosened contaminant. The shape of the drain chamber radially outward from the gathering blade and the inertia of the rotating liquid creates a tight vortex in the drain chamber. The helical contour of this chamber in the direction of rotation forces the vortex downward into the drain compartment at the bottom of the filter housing. Here the contaminant particles are confined and when the drain is opened, all the trapped contaminants are flushed from the housing. This process is continuous thereby the filter element is kept free of contaminants as long as liquid flow and filter element rotation are maintained.

In another embodiment, the helical inlet manifold is omitted and the filter liquid merely introduced into the housing externally of the filter element with the remainder of the apparatus remaining the same. Thus, in this embodiment, the effect of the inlet manifold as above described is lost but the operation of the internal deflector and gathering blade remain the same as above described.

DETAILED DESCRIPTION

According to the invention, there is in this embodiment provided a generally cylindrical filter housing 1 mounted fixedly on suitable frame structure, here indicated at 2. Said housing has a tubular side member 1a and end members 1b and 1c solidly connected thereto. Said frame structure may be of any conventional sort appropriate to the circumstances of mounting the filter element and hence needs no detailing. A generally cylindrical element 3 is rotatably mounted within the housing 1, preferably coaxially therewith. There is provided an inlet manifold 4 for introducing liquid to the filter into said housing as further described hereinafter and a filtrate outlet 6 which is in this embodiment located at the upper end of the filter unit.

The filter element 3 consists in this embodiment of a perforated tube 7 covered in a conventional manner with a wire mesh screen 8 which is here retained on the cylinder by a wire wound cage 9. The filter element 3 has a solid bottom end piece 11 permanently fixed at the bottom end thereof and a cover piece 12 permanently fixed to the upper end thereof. The cover 12 has a hollow shaft 13 permanently fixed thereto and extending upwardly therefrom for permitting outflow of filtrate from inside the filter element 3. The hollow shaft 13 communicates with a suitable conduit 14 which conducts the filtrate to the point of use.

To drive the filter element, there is provided suitable drive means which in this embodiment is indicated as a gear motor but may also be a chain driven sprocket or other power means, same being mounted below the filter element and drivingly connected through a motor shaft 16 positioned coaxially with the filter element. An extension shaft 17 projects coaxially from the motor shaft 16 through the bottom plate 1C of the housing and drivingly connects to the bottom plate 11 of the filter element in any convenient manner, such as by having a noncircular projecting end 19 on said shaft projecting into a correspondingly shaped hole in the bottom 11 of the filter element. Said shaft is guided and supported by bearings 21 and 22, one of which, here the bearing 21, bearing in a supporting manner against an appropriate shoulder 20 on the shaft extension 17. A conventional seal 23 is provided to protect the bearings from filter liquid and the entire assembly fixed rigidly to the bottom plate 18 of the filter housing in any desired manner, here by the long bolts 24 and 26. Further screws are provided as needed for compressing the packing of the sealing means 23 in a conventional manner.

The upper end of the hollow shaft 13 is supported and guided in a bearing 31 which is in turn supported through a suitable retainer 32 by conventional means, such as long bolts 33 and 34 onto a bearing base 36. The bearing base is secured by conventional means, such as screws 37, onto the abovementioned upper end member 1b of the filter housing 1. Suitable sealing means 31 is provided in the bearing base 36 to prevent escape of filter liquid from within the housing 1 and a further sealing means 42 is provided to protect the bearing 31. Said sealing means may be conventional packing, rotary seal or other sealing devices as desired. The outlet conduit 14 is connected to a top flange 43 by which same is mounted through the long bolts 33 and 34 to the entire seal and bearing package above described.

Returning now to the inlet means 4, there is in this embodiment provided a manifold 46 arranged on a helix angle as defined below, with respect to the filter axis and mounted rigidly onto the casing 1a of the housing 1. An opening 47 extends from the manifold 46 into the interior of the housing 1 and follows the same helix angle as above mentioned. It will be recognized that while the inlet opening 47 is here shown as a continuous slot, same may if preferred also be a series of separate but closely spaced individual holes. A directing blade 48 is arranged along the edge of the opening 47 and is positioned to direct fluid flowing from the inlet manifold 46 toward and generally tangentially against the filter element 3 in the direction opposite to the latter's direction of rotation. For this purpose, the directing blade 48 extends from the downstream (the terms "upstream" or "downstream", respectively, as hereinafter used being taken with respect to the direction of filter element rotation) edge of the opening 47 toward and generally tangentially to said filter element, the extension from such edge toward the filter element projecting upstream, i.e., oppositely to the direction of rotation of the latter.

An elongated, nonrotatable, shaft 51 extends concentrically through the filter element 7 and is fixed by any convenient means such as the spider 52 nonrotatably with respect to the outlet conduit 14. Said shaft extends to the bottom of the rotatable filter element 7 and is received into a suitable bearing 53 which is mounted on the bottom plate 11 of said filter element. Said long shaft 51 is stabilized and maintained concentric with the filter element by suitable spiders such as the spiders 54 and 56 which encircle the shaft 51 and also act to hold th filter element 3 against collapsing. Said guide means 54 and 56 are not here shown as including bearings between same and said shaft but such bearings may be provided if desired.

Figure 4:
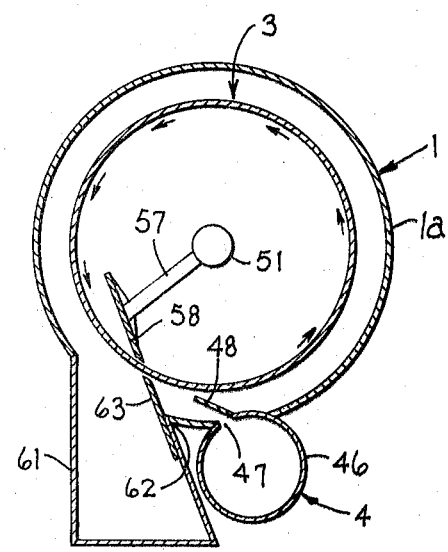
FIG. 4 is an enlarged section taken on line IV—IV of FIG. 3 showing details of the vortex producing elements. The arrows indicate the rotational direction of the filter element.
Figure 2:
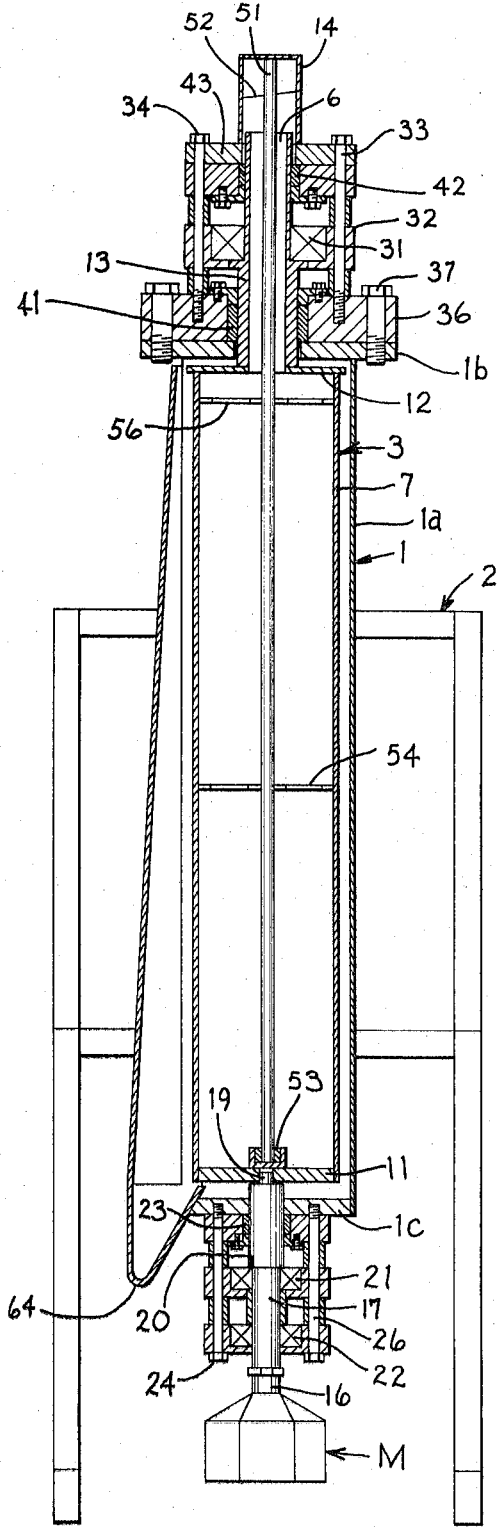
FIG. 2 is a central sectional view of a filter unit embodying the invention, this embodiment utilizing a gear motor to drive the filter element.

Such shaft 51 is provided with radially projecting arms 57 which support a deflector blade 58 which latter extends the full length of the filter element 3. It is aligned as best shown in FIG. 4, immediately upstream (taken in the direction of rotation of filter element 3) from the point at which inlet liquid is caused by the directing blade 48 to impinge against said filter element. Otherwise described, said deflector 58 lies on a chord of said filter element intersecting same at, or close to, the point of tangency of the directing blade 48, as projected, with respect to said filter element 3. The deflector 58 describes a relatively low angle, such as approximately 30° with the tangent at the point of intersection of such chord for purposes appearing hereinafter.

A filter cake receptacle, or contaminant concentration chamber 61 is arranged in the side of the housing 1 for reception and disposition of filter cake removed from the exterior of the rotating filter element 3. In this embodiment, the upstream edge of said receptacle 61 is at least substantially parallel with the axis of the filter element 3 while the downstream edge 62 thereof substantially parallels the helix defined by the upstream edge of the inlet opening 47. A gathering blade 63 projects toward the filter element 3 from the downstream wall of the receptacle 61, same being fixed thereto in any convenient manner such as by screws or bolts. Said blade is preferably on substantially a projection of the above-mentioned chord but same may be a short distance downstream therefrom if preferred. Said blade terminates as close as possible to the outer surface of the filter element 3 although same will ordinarily not scrape thereagainst.

A drain reservoir 64 is desirably provided at the bottom end of the receptacle 61 and same then connects through suitable valve means 66 through the outlet to disposal means not shown.

An inlet conduit 67, provided with a valve 68 and pressure gauge 69, is provided in a conventional manner for supplying liquid to be filtered to the inlet manifold 4 and a discharge conduit 71 fitted with a valve 72 and pressure gauge 73 are provided as desired according to the given installation in connection with outlet conduit 14.

OPERATION

While the operation of the apparatus has been somewhat indicated above, it will be set forth in more detail hereinafter to insure a complete understanding of the invention.

The actual operation of liquid filtration accomplished by this apparatus consists of introducing the fluid to be filtered through the inlet fitting 67 to the elongated, helically shaped inlet manifold 4. From this manifold the fluid is forced through the opening 47 to the inside of the housing 1. In so doing, the flow is directed by directing blade 48 to impinge upon the filter element screen 8 which is being rotated about its vertical axis by the drive source at the bottom end. The fluid is thus caused to pass through the filter element screen 8 and perforated tube 7, with the contaminants in the fluid being retained on the screen while the clean liquid passes through the screen into the interior of the filter element. This filtered liquid thereafter flows upward along the inside diameter of the filter element 3, through the hollow shaft 13 in the top cover of said element 3 and out through the outlet fitting 14 to be used for its intended purpose.

The contaminant which has remained behind on the constantly rotating filter element 3 moves with the filter screen and thin layers of liquid on both the inside and outside surfaces of the element in a peripheral path about the vertical axis of the element. As the whirling filtrate on the inside of the filter element approaches the stationary deflector vane 58, a small quantity of the fluid is forced by said vane against and through the screen in a backwash direction. This outflow occurs slightly ahead of or, preferably, at the precise point where the incoming jet of the fluid from the director 48 is impinging on the filter element 3 in the opposite direction of said filter element rotation and in effect peels off and redirects the fluid and contaminant adhering to the outside surface of the filter element. Also located either slightly behind, but preferably at, this precise point, the gathering blade 63 gathers the redirected stream of contaminated fluid and turns it into the drain chamber, or receptacle, 61 where the inertia of the moving fluid and the downwardly facing helical slant of the wall 62 of the receptacle 61 induces a tight vortex. This vortex has a rotational direction following the rotation of the filter element and thus is constantly reinforced while rotation and flow are maintained.

The downwardly facing helix angle of the receptacle 61 directs the vortex downward where it eventually enters the drain reservoir 64. At this point the sudden expansion to a larger volume container dissipates the vortex, allowing the contaminants to settle out or become trapped. Thus, the helix angle of the wall 62 is determined by the angle required according to known practice to induce the vortex above described under a given set of operating conditions. In the illustrated embodiment this angle is 4° – 6° with respect to the vertical axis of the filter element 3. Further, since the adjacent edges of the gathering blade 63 and the deflector 58, as well as the inlet opening 47 and directing blade 48, are all parallel to the wall 62, the helix angle for all of these is the same as that of wall 62, or, in this embodiment, between 4° and 6° with respect to the vertical axis of the filter element.

The blow-off valve 66 in the drain tube 65 may be periodically opened to flush out the highly contaminated fluid in the reservoir 64 or in some cases this valve could be cracked slightly to continually drain away the contaminants.

In addition to the actions described above, centrifugal force plays a role throughout the cleaning cycle in achieving a self-cleaning action for the filter. In the case of the contaminant on the filter element, the rotational velocity of the element will tend to throw the heavier contaminants away from the screen, permit them to circulate outside of the element, but with same, to the gathering blade 63 and thence also into the drain vortex. Once in the vortex, the heavier contaminant will often be forced to the outside to be trapped in the stagnant fluid pockets created in the corners of the drain chamber. In this case gravity will make these particles float toward the bottom and into the reservoir chamber.

It becomes obvious from the above description that under ordinary circumstances the filtration system described will be effectively self-cleaning. It has been further found that such a filtration system is effective for fluids with relatively high concentrations of contaminants per fluid volume or for fluids in which contaminant concentration vary considerably during the operation cycle. This filtration system is, furthermore, more insensitive to the types of contaminants in the fluid than normal filters and will, within reasonable limits, operate efficiently regardless of the shape or quantity of contaminating material in the fluid.

MODIFICATIONS

The embodiment of the invention shown in FIG. 1 indicates a gear motor connected in line with the vertical axis of the filter element as the driving source. The desired rotary motion of the filter element can be imparted in many and varied manners and at various velocities to achieve the same result. The shaft extending from the filter element downward may be fitted with a sprocket and a remotely mounted power source, such as an electric or air motor can, through a chain or other drive mechanism, be utilized to drive the filter element.

The mounting configuration of the housing may also be changed to a wall mount and the housing can be operated in either a vertical or horizontal position.

The location and configuration of the inlet manifold, flow directing blade, deflector blade, gathering blade and drain chamber can be altered and refined as already indicated above to adjust filtering capabilities to the various flow rates, contaminant consistencies and desired results. Particularly, while it is preferable for the deflector 58 and gathering blade 63 to be in alignment with each other and for the fluid directed by the directing plate 48 to impinge upon the filter screen at a point thereon, as closely as possible to the substantially adjacent ends of said deflector and gathering blade, it is possible for the deflector 58 to be moved somewhat upstream (referring to the direction of rotation of the filter element 3) with respect to the gathering blade 63 and the point of impinging of the fluid from the opening 47. However, while this appears to be a possible variation, there is no apparent advantage in so doing and actually may have some disadvantages.

Further, if desired, the inlet manifold 46 may under some circumstances be omitted entirely and the liquid to be filtered merely introduced through a suitable conduit at any point in the cylindrical housing 1 (FIG. 6). In such case a baffle 77 will be preferably placed interiorly of the inlet 76 to protect the rotating filter unit 3 from erosion by the incoming liquid to be filtered. The fluid will still move through the filter element 3 and the clear filtrate out through the exit conduit 14 in the same manner as above described and the filter cake will be moved off from the filter element by the deflector 58 in the same manner as above described. However, in such case, the fluid deflected by said deflector 58 is still relied upon for dislodging the filter cake but the jetting action obtained in the first above-described embodiment of the incoming fluid against the at least partially dislodged filter cake at the point 80 is lost. This will be acceptable where the filter cake is not particularly sticky and the effect of the deflector 58 is sufficient to dislodge same. However, where the filter cake cannot be sufficiently dislodged by the use only of the deflector 58, then the jetting action of the narrow slot 47 together with the directing plate 48 will be advantageous.

In FIG. 7 there is shown a modification which will embody at least some of the advantages of the invention. Here instead of a deflector 58 there is provided an internal tube 91 having a slot, or series of openings, 92 along the surface thereof adjacent the internal surface of the rotating filter 3. Said openings 92 are placed immediately inside of or slightly upstream of, the inward edge of the gathering blade 63. Filtrate or other compatible liquid may then be introduced in any convenient manner, as through the center of the shaft 17, into the pipe 91 and is directed through the openings 92 against the interior of the filter unit 3. This effects the continuous backwashing of the filter unit closely adjacent the gathering blade 63 and the point of impingement of the inlet jet against the outer surface of said filter unit. This broadly accomplishes the same purpose as the relative rotation between the deflector 58 and the filter unit and has the advantage that a different fluid may be used if desired for effecting the backwashing operation. However, it also presents certain disadvantages and hence is capable of accomplishing only a portion of the objects of the invention.

While the present embodiment has shown both the deflector 58 and the receptacle 61 to be mounted fixedly with respect to the base upon which the equipment is mounted and the filter unit to be rotating, it will be within the broadest aspect of the invention to orbit the deflector 58 around the inside of the filter unit preferably while continuing to rotate the filter unit in the manner already shown and to do so either with or without similarly orbiting the receptacle 61. These variations, however, while embodying certain of the broadest aspects of the invention present other problems and disadvantages, especially complexity of design, and hence cannot be considered to possess all of the advantages and aspects of the invention as above set forth.

The system can be automated to the extent that a timer can be used to open the drain blow-off valve at desired intervals; which intervals can be determined after experimentation with each particular contaminant level.

While specific embodiments of the invention have been utilized here for disclosure of the invention, it will be recognized that said embodiments are chosen solely for illustrative purposes and that the principles of the invention may be applied through a number of other embodiments which will be immediately recognized as available by those skilled in the art.

The embodiments of the invention in which exclusive property or privilege is claimed are defined as follows:

1. In a self-cleaning filter unit for removing solid material from a liquid to be filtered, the combination comprising:
   a housing and a solids receptacle communicating with said housing; a filter element within said housing, said housing and filter element being relatively rotatable;
   inlet means introducing liquid into said housing externally of said filter element and means for withdrawing filtrate from within said filter element;
   a filtrate deflector within said filter element and aligned on a nondiametric chord of said filter element, said deflector being fixedly located with respect to said housing and receptacle, and means relatively rotating siad filter element and deflector for deflecting a cleaning flow of filtrate from within the filter element radially outwardly therethrough toward a discrete location fixed with respect to said receptacle.

2. The filter unit of claim 1, wherein said deflector is stationary and the filter element rotates in a direction to carry filtrate therewith against the fixed deflector for deflection outwardly through the filter element and into the receptacle.

3. The device of claim 2 including a gathering blade and means fixing same on said housing at or downstream of said deflector for further directing said cleaning flow of filtrate from said deflector outwardly from said filter element and to said receptacle for solids collection and for substantially preventing return to the filter element of solids in said cleaning flow.

4. The device of claim 3, wherein said gathering blade extends from said receptacle into said housing and to a point closely adjacent the external surface of said filter element for flow directing coaction with the deflector.

5. The device of claim 3 in which said gathering blade is substantially aligned with said deflector, so as to smoothly continue outward flow of liquid and solids from said filter element to said receptacle.

6. The device defined in claim 3 in which said inlet means comprises an inlet on said housing immediately downstream of said gathering blade, said inlet being directed angularly substantially toward said gathering blade and filter element for causing incoming liquid to assist said deflector and gathering blade in displacing solid material from the filter element exterior into said receptacle.

7. The device of claim 1, in which said receptacle and filter element are relatively rotatable and in which said receptacle is arranged on said housing circumferentially adjacent and radially outward of said deflector, said receptacle including means defining a solids concentration chamber for accumulating liquid and solid material following said filter element and creating a vortex thereof within said chamber to settle such solid material to the bottom of said chamber for withdrawal.

8. The device of claim 7 including a gathering blade extending from the downstream side of said chamber toward said filter element to a point near the downstream edge of said deflector for smoothly guiding said outward cleaning flow from said deflector into the downstream portion of said chamber.

9. The device of claim 1 in which said inlet means comprises an inlet fixed with respect to said deflector, said inlet including means causing said fluid to impinge upon said filter element at a point thereon at least close to that edge of said deflector which is adjacent the internal surface of said filter element.

10. The device of claim 9 wherein said deflector and said inlet both extend helically substantially the full length of said filter element and both define substantially the same helix angle with respect thereto.

11. The device of claim 1 in which said housing and receptacle define upstanding side-by-side communicating chambers, the rotational axis of said filter being upstanding, said receptacle including means adjacent said deflector for forming said cleaning flow into a vortex in said receptacle chamber.

12. In a self-cleaning filter unit the combination comprising:
 a generally cylindrical housing;
 a generally cylindrical filter element coaxially within said housing and mounted rotatably with respect thereto;
 an inlet manifold communicating with interior of said housing externally of said filter element and arranged for directing incoming fluid to be filtered generally tangentially against said filter element in a direction opposite to the direction of rotation of said filter element;
 a deflector within said filter element fixed with respect to said housing and aligned on a nondiametric chord of said filter element, said chord angling from a diameter through the outer edge of said deflector in a direction opposite to the direction of rotation of said filter element, whereby filtered liquid rotating within and with said filter element will tend to move radially outwardly through said filter element for cleaning thereof;
 a contaminant concentration chamber arranged closely adjacent and radially outwardly of said filter element and fixed with respect to said housing, same including a gathering blade extending from the downstream wall of said chamber to a line closely adjacent external surface of said filter element and not upstream of said chamber, whereby material laden liquid following the exterior of said rotating filter element will be directed into said chamber and said material permitted to settle to the bottom thereof for withdrawal of same, said deflector and said gathering blade being in substantial alignment with each other;
 means for withdrawing filtrate from within said filter element.

13. The device of claim 12 wherein at least the downstream wall of said chamber is arranged on a downwardly facing helix angle with respect to the rotational axis of said filter element, said angle being of sufficient magnitude to induce a downwardly spiralling vortex in the liquid entering thereinto; and
 wherein said deflector blade and said inlet manifold extend substantially the full axial length of said filter element and are arranged on substantially the same helix angle as said wall.

14. The device of claim 12 in which said deflector, gathering blade and inlet manifold are arranged in close spaced progression along the rotational path of said filter element for cooperatively displacing material contaminating the exterior of said filter element into said chamber.

15. In a filter unit having a relatively rotating housing and filter element, the combination comprising:
 a housing;
 a filter element within said housing and rotatable with respect thereto;
 means introducing liquid into said housing and externally of said filter element and means for withdrawing filtrate from within said filter element;
 a deflector within said filter element arranged for relative motion circumferentially of said filter element and aligned on a nondiametric chord of said filter element whereby relative circumferential motion between said filter element and said deflector in a direction to cause filtrate within said filter element to impinge against the outwardly facing surface of said deflector will tend to direct filtrate radially outwardly through said filter element for cleaning thereof;
 a contaminate concentration chamber arranged closely adjacent and radially outwardly of said filter element, said chamber and filter element being relatively rotatable whereby liquid and solid material following said filter element will tend to accumulate and create a vortex within said chamber whereby said contaminate will be permitted to settle to the bottom thereof for withdrawal;
 a gathering blade extending from within said chamber to a point closely adjacent the external surface of said filter element, said blade and said deflector being normally at all times in at least substantial alignment with each other.

16. The device of claim 15, wherein said gathering blade defines a helix angle with respect to the axis of said filter element.

17. The device of claim 15 an inlet manifold communicating with the interior of said housing externally of said filter element and arranged for directing incoming fluid to be filtered generally tangentially against said filter element.

18. The device of claim 15 including a liquid inlet communicating with the interior of the housing outside the filter element and wherein said deflector, said gathering blade and said inlet all extent helically substantially the full length of said filter element and all define substantially the same helix angle with respect thereto.

* * * * *

UNITED STATES PATENT OFFICE
CERTIFICATE OF CORRECTION

Patent No. 3,847,817　　　　　　　　　Dated November 12, 1974

Inventor(s) Ronald D. Jarman

It is certified that error appears in the above-identified patent and that said Letters Patent are hereby corrected as shown below:

Col. 4, line 14; change "means 31" to ---means 41---.

Col. 11, line 6; after "claim 15" insert ---in which said means introducing liquid includes---.

Signed and sealed this 21st day of January 1975.

(SEAL)
Attest:

McCOY M. GIBSON JR.　　　　　　　　　C. MARSHALL DANN
Attesting Officer　　　　　　　　　　Commissioner of Patents